United States Patent
Wandén et al.

(10) Patent No.: US 6,322,130 B1
(45) Date of Patent: Nov. 27, 2001

(54) FOLDING TOP MECHANISM FOR A CONVERTIBLE, ROLLOVER PROTECTION SYSTEM, AND A CONVERTIBLE

(75) Inventors: Ari Wandén; Matti Kinnanen, both of Uusikaupunki (FI)

(73) Assignee: Valmet Automotive Oy, Uusikaupunki (FI)

( * ) Notice: Subject to any disclaimer, the term of this patent is extended or adjusted under 35 U.S.C. 154(b) by 0 days.

(21) Appl. No.: 09/513,385

(22) Filed: Feb. 25, 2000

(30) Foreign Application Priority Data

Mar. 3, 1999 (FI) .................................................. 990463 U

(51) Int. Cl.[7] ...................................................... B60J 7/08
(52) U.S. Cl. ................................ 296/107.01; 296/107.03; 296/107.07; 296/107.09; 296/147; 280/756
(58) Field of Search ........................ 296/107.01, 107.09, 296/107.03, 107.07, 147, 146.1; 280/756

(56) References Cited

U.S. PATENT DOCUMENTS

| | | | |
|---|---|---|---|
| 4,516,803 | * | 5/1985 | Kaltz et al. ............................ 296/107 |
| 4,557,502 | | 12/1985 | Scaduto et al. ........................ 280/756 |
| 4,695,089 | * | 9/1987 | Fuktomi et al. ....................... 296/107 |
| 4,708,389 | * | 11/1987 | Maebayashi et al. ................ 296/107 |
| 4,712,828 | * | 12/1987 | Albrecht ............................ 296/107 X |
| 4,828,317 | * | 5/1989 | Muscat .............................. 296/170 X |
| 4,991,902 | * | 2/1991 | Schrader et al. ....................... 296/107 |
| 5,050,663 | * | 9/1991 | Rhoads et al. ..................... 296/107 X |
| 5,056,816 | | 10/1991 | Lutze et al. ............................ 280/756 |
| 5,094,478 | | 3/1992 | Pfanzeder et al. ..................... 280/756 |
| 5,236,219 | | 8/1993 | Jambor et al. ......................... 280/756 |
| 5,284,360 | | 2/1994 | Busch et al. ........................... 280/756 |
| 5,393,093 | | 2/1995 | Wunsche et al. ...................... 280/756 |
| 5,641,193 | * | 6/1997 | Zepnik et al. ......................... 296/107 |
| 5,702,150 | | 12/1997 | Reuter et al. .......................... 280/756 |
| 5,772,274 | * | 6/1998 | Tokarz ................................... 296/107 |
| 5,903,119 | * | 5/1999 | Laurain et al. ................... 296/107 X |
| 6,039,382 | * | 3/2000 | Mather et al. ................... 296/107.01 |
| 6,048,021 | * | 4/2000 | Sautter, Jr. ................... 296/107.09 X |
| 6,068,326 | * | 5/2000 | Shiromura ................... 296/107.09 X |

FOREIGN PATENT DOCUMENTS 454 279   10/1991   (EP) .

OTHER PUBLICATIONS

Derwent Abstract, Roll–over protection device for convertible car–has support strut, which is supported on body via support unit, when in operational position, Accession No. 96–434463/44, Oct. 2, 1996.

Derwent Abstract, Roll over bar for open top vehicles–is mounted behind rear seats onswivel mountings and is deployed by servo drive when vehicle rools, Accession No. 97–180751/17, Mar. 20, 1997.

* cited by examiner

*Primary Examiner*—Joseph D. Pape
*Assistant Examiner*—Lori L Coletta
(74) *Attorney, Agent, or Firm*—Andrus, Sceales, Starke & Sawall, LLP

(57) ABSTRACT

The invention concerns a folding top mechanism (1) for a convertible, a rollover protection system and a convertible. The top mechanism (1) is combined with a rollover bar (2[5]) providing rollover protection, said rollover bar being pivotally connected to the top mechanism (1) so that it turns in synchronism with it, and that the rollover bar (2[5]) forms a frame to which a rear window (4) is connected.

18 Claims, 3 Drawing Sheets

FOLDING TOP MECHANISM FOR A CONVERTIBLE, ROLLOVER PROTECTION SYSTEM, AND A CONVERTIBLE

BACKGROUND OF THE INVENTION

The present invention relates to a car top mechanism as defined in the claims. Furthermore, the invention relates to a rollover protection mechanism as defined in the claims. In addition, the invention relates to a convertible as defined in the preamble of claims.

In prior art, e.g. specifications U.S. Pat. Nos. 5,284,360, 5,094,478, 5,056,816, 5,236,219, 5,393,093 present different solutions for rollover protection of convertibles using a rollover bar which turns or is drawn into a concealed position and emerges when needed.

On the other hand, there are conventional multi-link top mechanisms used in convertibles, by means of which a soft flexible covering can be stretched over the passenger compartment and removed from this position. Similarly, there are multi-link top mechanisms used in conjunction with substantially rigid roof panel components forming a folding hard top.

In prior-art convertibles, the structures, actuating devices and functions of the rollover bar and those of the top mechanism are completely separate from each other because the rollover bar has been so designed that it will work in both the open and the closed positions of the folding top. The structures are therefore complicated and expensive.

BRIEF SUMMARY OF THE INVENTION

The object of the invention is to disclose a completely new type of top mechanism with an integrated rollover protection which is safer than previously known top mechanisms in the case of a rollover accident.

As for the features characteristic of the top mechanism, rollover protection system and convertible of the invention, reference is made to the claims.

According to the invention, the top mechanism is combined with a rollover bar for rollover protection which is linked with the top mechanism so that it turns in synchronism with the latter. The rollover bar forms a frame to which the rear window is connected.

In an embodiment of the top mechanism, the top mechanism is the-top mechanism of a so-called soft top structure, which comprises top bows for supporting a flexible covering in the closed position of the roof. In the top mechanism, the rollover bar is the rearmost bow, to which the rear edge of the covering is fixed and which determines the shape of the rear edge of the roof.

In an embodiment of the top mechanism, the top mechanism is the top mechanism of a folding hard top structure which comprises at least one substantially rigid roof panel component.

The rollover protection system for a convertible according to the invention comprises a rollover bar extending in the transverse direction of the convertible in the rear part of the passenger compartment. The rollover bar is pivotally connected to the body of the convertible so that it can turn about a horizontal transverse axis of the convertible between a substantially horizontal lowered position and a raised position. The system further comprises means for supporting the rollover bar and locking it in the raised position rigidly with respect to the body.

According to the invention, the rollover bar has been arranged to be turnable in synchronism with the top mechanism of the folding top of the convertible. The rollover bar forms a frame to which the rear window is connected.

In an embodiment of the system, the top mechanism is the top mechanism of a so-called soft top structure, which comprises top bows for supporting a flexible covering in the closed position of the roof. The rollover bar is the rearmost bow in the top mechanism, to which the rear edge of the covering is fixed and which determines the shape of the rear edge of the roof.

In an embodiment of the system, the top mechanism is the top mechanism of a folding hard top structure comprising at least one substantially rigid roof panel component.

The convertible of the invention comprises a folding top fitted to cover at least part of the passenger compartment. The roof comprises a multi-link top mechanism which can be moved by means of an operating device between a closed position in which the roof extends over the passenger compartment and an open position in which the roof has been folded up from its position over the passenger compartment. The convertible further comprises a rollover bar extending in a transverse direction of the vehicle in the rear part of the passenger compartment, forming a rollover protector. The rollover bar is pivotally connected to the body of the convertible so that it can turn about a horizontal transverse axis of the convertible between a substantially horizontal lowered position and a raised position. In addition, the convertible is provided with means for supporting the rollover bar and locking it in the raised position so as to make it rigid with respect to the body.

According to the invention, the rollover bar has been arranged to be turnable in synchronism with the top mechanism. The rollover bar forms a frame to which the rear window is connected.

In an embodiment of the convertible, the top mechanism is the top mechanism of a so-called soft top structure, which comprises top bows for supporting a flexible covering in the closed position of the roof. In the top mechanism, the rollover bar is the rearmost bow, to which the rear edge of the covering is fixed and which determines the shape of the rear edge of the roof.

In an embodiment of the convertible, the top mechanism is the top mechanism of a folding hard top structure which comprises at least one substantially rigid roof panel part.

In an embodiment of the convertible, the rear window is attached to the rollover bar e.g. by gluing. The rear window may be made of prestressed or laminated glass, plastic or some other suitable window material.

In an embodiment of the convertible, the rear window is openable. In this case, the when the top is in its closed position, the side windows as well as the rear window can be open at the same time so that an air flow can pass from the side into the compartment and out through the rear window opening bordered by the rollover bar.

In an embodiment of the convertible, the rear window is connected to the rollover bar via hinges at its lower edge so that it can be turned between a closed and an open position. In its closed position, the rear window can be locked by means of a suitable locking device disposed e.g. at the upper edge of the rear window.

In an embodiment of the convertible, the rollover bar comprises window guide tracks. The rear window can be moved along the window guide tracks between an open and a closed position. The convertible may be provided with a manual or powered operating mechanism for moving the rear window.

In an embodiment of the convertible, the part of the rollover bar comprising the rear window is placed in a plane inclined by 10°–25° with respect to the vertical plane, preferably in the rearward direction. The rearward inclination of the rear window gives the vehicle a different appearance and also provides more space for the heads of passengers on the rear seat.

An embodiment of the convertible comprises a connecting lever pivotally connected by one end to the rollover bar and by the other end to at least one turnable part of the top mechanism to cause the rollover bar to move together with the top mechanism.

In an embodiment of the convertible, the means for supporting and locking the rollover bar comprise supporting legs, which are fixedly connected to the rollover bar and whose lower ends in the raised position of the rollover bar rest on a back stop provided on the body at a distance from a fulcrum of the rollover bar, and a releasable and lockable locking device for locking the supporting legs to the body.

In an embodiment of the convertible, the locking device comprises a pivoted lever pivotally connected to the body so that it can turn between a releasing position and a locking position, said pivoted lever comprising a locking clutch for engaging the end of the supporting leg in the raised position of the rollover bar; a spring for applying a load to the pivoted lever to turn it to the locking position, and a power means for turning the pivoted lever into the releasing position.

In an embodiment of the convertible, the rollover bar in its raised position is located behind the head space of the rear seat of the convertible.

The invention has the advantage that, due to the rollover bar integrated with the top mechanism of the convertible, the top mechanism provides greater safety than prior-art top mechanisms in the case of a rollover accident when the roof is in its closed position extended over the passenger compartment. A further advantage of the invention is that the rollover bar constitutes a firm mounting frame for the rear window. The combination of rear window mounting frame and rollover bar, to whose upper edge the covering fabric is attached, can be inclined to a desired angle so that it provides additional value for the vehicle in respect of appearance. Furthermore, combining the rear window with the rollover bar makes it possible to maximize the rearward field of view.

BRIEF DESCRIPTION OF THE SEVERAL VIEWS OF THE DRAWING

In the following, the invention will be described in detail by the aid of a few examples of its embodiments with reference to the drawing, wherein FIG. 2 presents a diagrammatic side view of an embodiment of the top mechanism of the invention in the closed position.

DETAILED DESCRIPTION OF THE INVENTION

Figure 1:
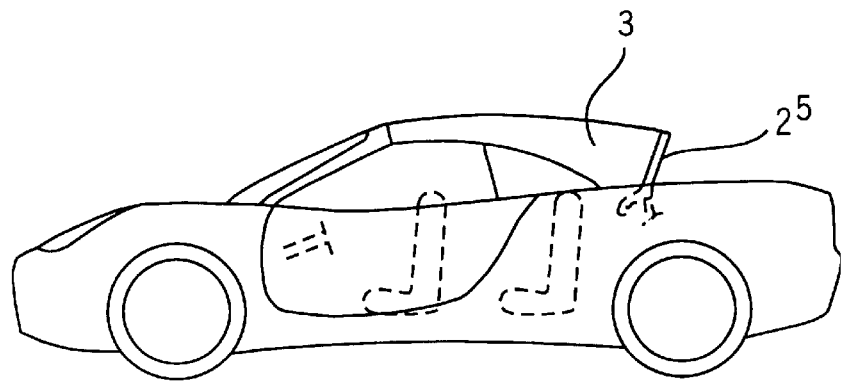
FIG. 1 presents a diagrammatic side view of an embodiment of the convertible of the invention, provided with a top mechanism and rollover protector as provided by the invention.

FIG. 1 shows a convertible comprising a folding soft cabriolet roof which, raised into its closed position, covers the passenger compartment of the convertible.

FIG. 2 presents the top mechanism of the convertible in FIG. 1. The roof comprises a flexible covering 3 and a multi-link top mechanism 1, to which the covering 3 is attached. The top mechanism can be moved by means of an actuating device 7 between a closed position where the roof extends over the passenger compartment and an open position where the roof has been retracted from over the passenger compartment. In respect of the structure of its lever arm mechanisms, the top mechanism may be any conventional mechanism used as a top mechanism, so they will not be described here in detail. The mechanism in FIG. 2 differs from previously known mechanisms only in respect of the arrangement of its fifth bow, i.e. the rearmost top bow.

Connected to the lever arms of the top mechanism 1 are five top bows $2^1$, $2^2$, $2^3$, $2^4$, $2^5$ for supporting the covering in the closed position of the roof. The roof covering 3 is attached by its front edge to the forward top bow $2^1$, which can be locked to the windscreen frame of the vehicle. The intermediate top bows $2^2$, $2^3$, $2^4$ between the foremost top bow $2^1$ and the rearmost top bow $2^5$ give the roof in its closed position a suitable shape in the conventional manner. The rear edge of the roof covering 3 is attached to the rearmost top bow $2^5$, which is so sturdy in construction and so rigidly locked with respect to the body that it also functions as a rollover bar. The rollover bar $2^5$ arches in a transverse direction relative to the car in the rear part of the passenger compartment from one side of the car to the other behind the rear passenger head space. It is pivotally connected to the body by a fulcrum A so that it can turn about a transverse horizontal axis L of the vehicle (see also FIG. 4) between a horizontal lowered position and a raised position (see FIG. 2). The rollover bar $2^5$ is a strong frame formed from tubes or profiled parts, and it can be locked firmly in relation to the body to hold it in the position shown in the figure. The rollover bar $2^5$ constitutes a rear window frame for a rear window 4, which in the example in FIG. 2 is glued fast on the rollover bar, thus further reinforcing the structure.

Figure 3:
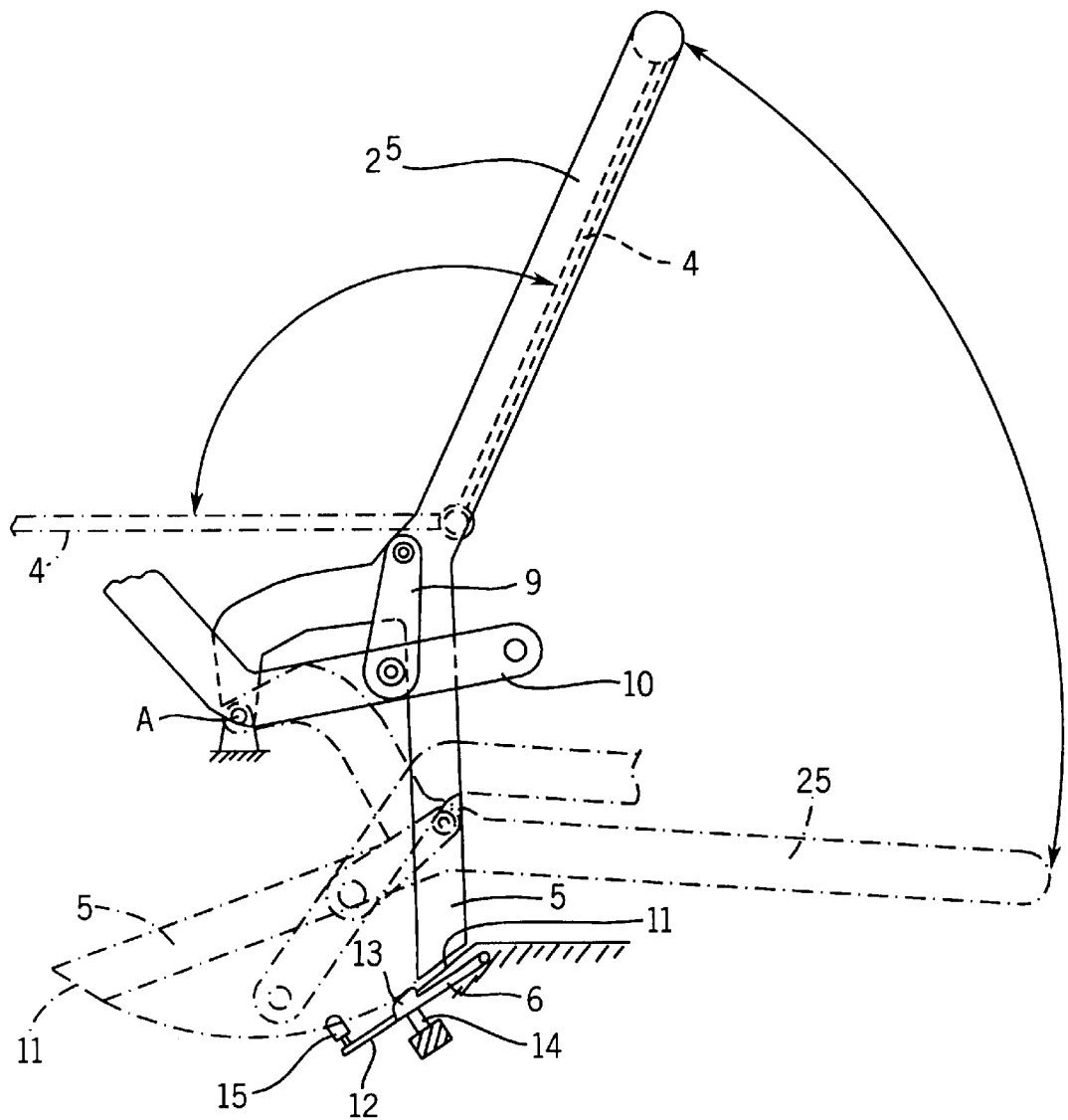
FIG. 3 presents a side view of the rollover bar comprised in the top mechanism in FIG. 2 in its raised and lowered positions.

FIG. 3 illustrates the turning of the rollover bar $2^5$ between the lowered position (depicted in the figure with dotted broken lines), which is the position of the rollover bar when the top mechanism (not shown in the figure) has been folded up into its retracted position, and a raised position (depicted with solid lines), which is the position of the rollover bar when the top mechanism is in its closed position. The part of the rollover bar $2^5$ comprising the rear window 4 lies in a plane inclined rearward by about 20° with respect to -the vertical plane. The rollover bar is provided with downward extending supporting legs 5 fixedly connected to it at each end. In the raised position of the rollover bar, the lower ends of the supporting legs 5 engage a back stop 11 provided on the body at a distance from the fulcrum A of the rollover bar. The rollover bar is locked to the body in a rigid raised position by means of a locking device 6 engaging the supporting legs 5. The locking device 6 comprises a pivoted lever 12 pivotally connected to the body so that it can turn between a releasing position and a locking position. The pivoted lever 12 comprises a locking clutch 13, which engages the end of the supporting leg 5 in the locking position when the rollover bar $2^5$ is in its raised position. A spring 14 applies a load on the pivoted lever 12 to keep it in the locking position. The locking can be released by a power means 15 which turns the pivoted lever into the releasing position, where the locking clutch 13 is disengaged from the end of the supporting leg 5.

The rollover bar $2^5$ is turned along with the rest of the top mechanism by the action of a connecting lever 9. The connecting lever 9 is pivotally connected by one end to the rollover bar $2^5$ and by the other end to at least one turnable part of the top mechanism 1; in the figure, this part is a lever 10 (partially shown in FIG. 3) comprised in the top mechanism. The rollover bar $2^5$ always moves in synchronism with the rest of the top mechanism when the roof is moved. When the roof is moved to its closed position, the rollover bar is automatically locked in position by the action of the locking device 6 described above. Correspondingly, when the roof is to be folded up, the front edge of the roof is unlocked from the windscreen frame and the locking device 6 is released so that the rollover bar $2^5$ can turn along with the rest of the mechanism. Using electric control, the release of the locking device 6 can be effected simultaneously with the release of the front edge locking.

The rollover bar $2^5$ in FIG. 3 is provided with an openable rear window 4. The rear window 4 is hinged by its lower edge on the rollover bar $2^5$ so that it can be turned downward into an open position. In FIG. 3, the rear window 4 has been arranged to be openable toward the passenger compartment, but naturally it can also be implemented as an outward opening window.

Figure 4:
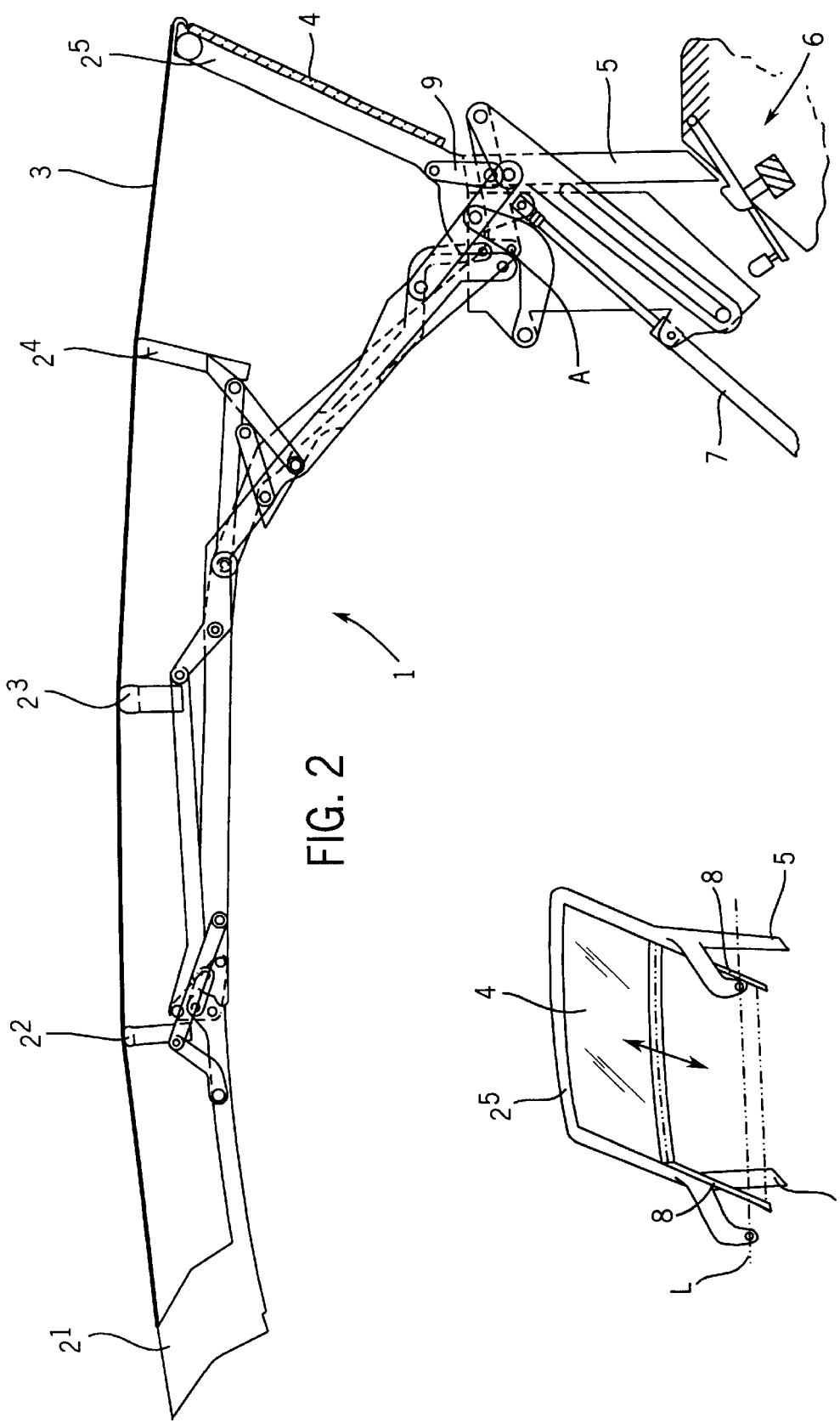
FIG. 4 presents a perspective view of the rollover bar in another embodiment of the top mechanism of the invention.

FIG. 4 presents a different solution, in which the rollover bar $2^5$ comprises parallel window guide tracks 8 at each vertical side of the bar. The rear window 4 can be moved along the guide tracks 8 between an open position and a closed position.

Figure 5:
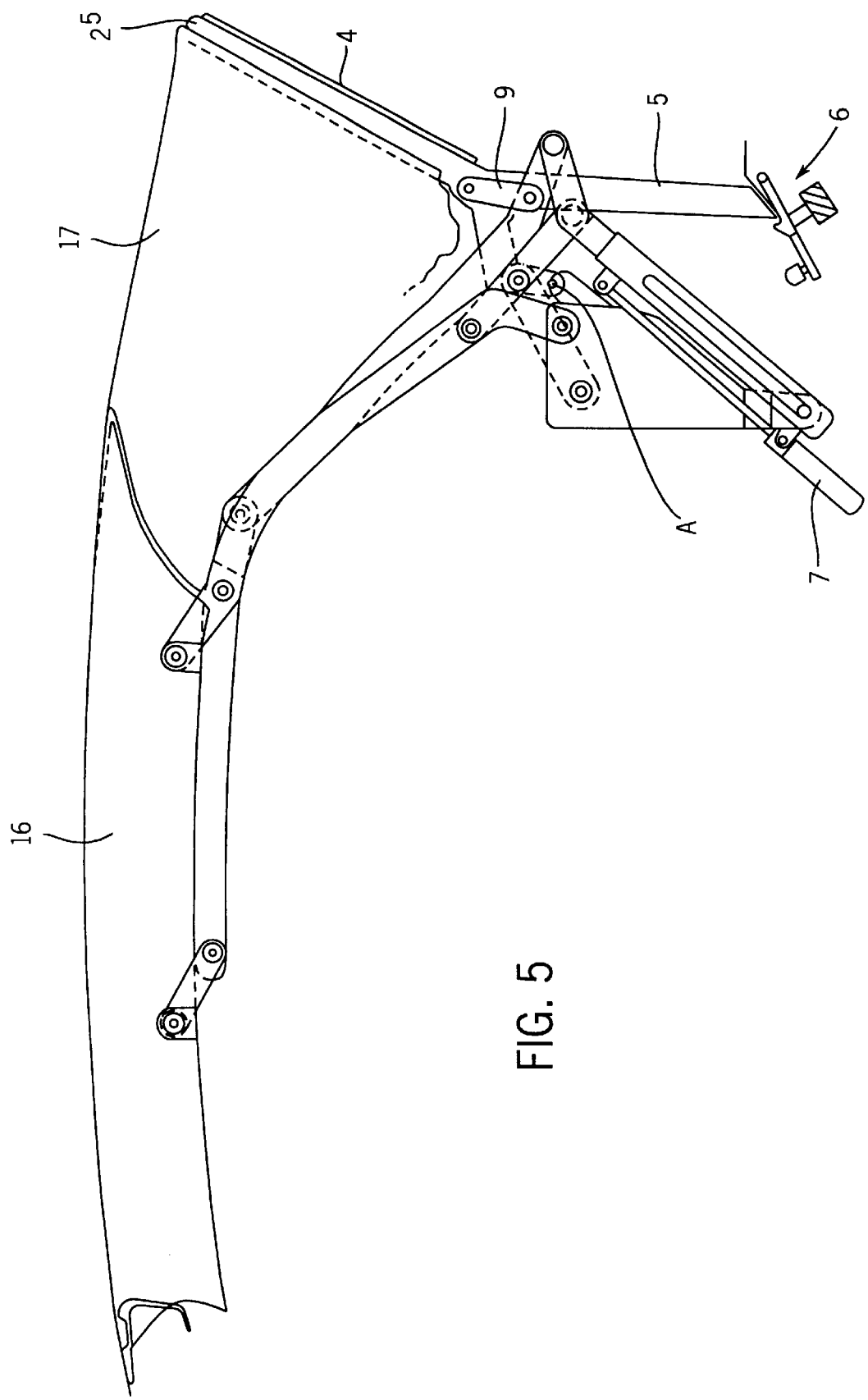
FIG. 5 presents a diagrammatic side view of a third embodiment of the top mechanism of the invention in its closed position.

FIG. 5 presents a folding hard top with a top mechanism 1 comprising two substantially rigid roof panel parts 16 and 17, which can be folded between a closed position as shown in FIG. 5 and an open position (not shown) by means of the top mechanism 1 operated by an actuating device 7. A rollover bar $2^5$ provided with a rear window 4 is pivotally connected to the body, and it is turned simultaneously with the top mechanism 1 by the action of a connecting lever 9 between the top mechanism 1 and the rollover bar. As for the structure of the rollover bar and the locking arrangement 6, reference is made to the description of FIGS. 2 and 3.

The invention is not restricted to the examples of its embodiments described above, but many variations are possible within the scope of the inventive idea defined in the claims.

What is claimed is:

1. Folding top mechanism (1) for a convertible automobile, characterized in that the folding top mechanism (1) is combined with a rollover bar ($2^5$), said rollover bar being formed to provide substantial rollover protection to the occupants of the convertible automobile when in a raised position, said rollover bar being pivotally connected to the folding top mechanism (1) so that it turns in synchronism with the folding top mechanism (1), and that the rollover bar ($2^5$) forms a frame for a rear window (4) of the convertible automobile.

2. Folding top mechanism as defined in claim 1, characterized in that the folding top mechanism (1) is the folding top mechanism of a soft top structure having a front and rear, said soft top structure comprising a plurality of top bows ($2^1$, $2^2$, $2^3$, $2^4$) arranged in tandem for supporting a flexible covering (3) in a closed position of the folding top mechanism; and that said rollover bar is located at the rear of the folding top mechanism, wherein said flexible covering is coupled to said rollover bar and said rollover bar forms a rear edge of the folding top mechanism, said rollover bar having a shape that defines the shape of the rear edge of the folding top mechanism.

3. Folding top mechanism as defined in claim 1, characterized in that the folding top mechanism (1) is the folding top mechanism of a folding hard top structure comprising at least one substantially rigid roof panel part (16, 17).

4. Rollover protection system for a convertible automobile having a body with a passenger compartment, said rollover protection system comprising: a rollover bar ($2^5$) extending in a transverse direction of the convertible automobile at the rear of the passenger compartment, said rollover bar being formed to provide substantial rollover protection to the occupants of the convertible automobile when in a raised position, said rollover bar being pivotally connected to the body of the convertible so that it can turn about a horizontal transverse axis of the convertible automobile between a substantially horizontal lowered position and the raised position, and means (5, 6) for supporting the rollover bar and locking it in the raised position rigidly with respect to the body, said rollover bar ($2^5$) being arranged to be turnable in synchronism with a top mechanism (1) of a folding top of the convertible automobile, and said rollover bar ($2^5$) forming a frame for a rear window (4) of the convertible automobile.

5. Rollover protection system as defined in claim 4, characterized in that the top mechanism (1) is the top mechanism of a soft top structure, which comprises a plurality of top bows ($2^1$, $2^2$, $2^3$, $2^4$) arranged in tandem for supporting a flexible covering (3) in a closed position of the top mechanism; and that said rollover bar is located at the rear of the top mechanism, wherein said flexible covering is coupled to said rollover bar and said rollover bar forms a rear edge of the top mechanism, said rollover bar having a shape that defines the shape of the rear edge of the top mechanism.

6. Rollover protection system as defined in claim 4, characterized in that the top mechanism (1) is the top mechanism of a folding hard top structure comprising at least one substantially rigid roof panel part (16, 17).

7. Convertible automobile, comprising a folding top fitted to cover at least part of a passenger compartment located in a body of the convertible automobile, said folding top comprising a multi-link top mechanism (1) which can be moved by means of an actuating device (7) between a closed position in which the folding top extends over the passenger compartment and an open position in which the folding top has been folded up from its position over the passenger compartment, said convertible automobile further comprising a rollover bar ($2^5$) extending in a transverse direction of the convertible automobile at the rear of the passenger compartment, said rollover bar being formed to provide substantial rollover protection to the occupants of the convertible automobile when in a raised position, said rollover bar being pivotally connected to the body of the convertible automobile so that it can turn about a horizontal transverse axis of the convertible automobile between a substantially horizontal lowered position and the raised position, and means (5, 6) for supporting the rollover bar and locking it in the raised position so as to make it rigid with respect to the body, said rollover bar ($2^5$) being arranged to be turnable in synchronism with the multi-link top mechanism (1) and the rollover bar ($2^5$) forming a frame for a rear window (4) of the convertible automobile.

8. Convertible automobile as defined in claim 7, characterized in that the multi-link top mechanism (1) is the top mechanism of a soft top structure, which comprises a plurality of top bows ($2^1, 2^2, 2^3, 2^4$) arranged in tandem for supporting a flexible covering (3) in the closed position of the multi-link top mechanism; and that said rollover bar is located at the rear of the multi-link top mechanism, wherein said flexible covering is coupled to said rollover bar and said rollover bar forms a rear edge of the multi-link top mechanism, said rollover bar having a shape that defines the shape of the rear edge of the multi-link top mechanism.

9. Convertible automobile as defined in claim 7, characterized in that the multi-link top mechanism (1) is the top mechanism of a folding hard top structure comprising at least one substantially rigid roof panel component (16, 17).

10. Convertible automobile as defined in claim 7, characterized in that the rear window (4) is attached to the rollover bar ($2^5$).

11. Convertible automobile as defined in claim 7, characterized in that the rear window (4) is openable.

12. Convertible automobile as defined in claim 11, characterized in that the rear window (4) is hinged by its lower edge on the rollover bar ($2^5$) so that it can be turned between a closed position and an open position.

13. Convertible automobile as defined in claim 11, characterized in that the rollover bar ($2^5$) comprises window guide tracks (8) and that the rear window (4) can be moved along the window guide tracks between an open position and a closed position.

14. Convertible automobile as defined in claim 7, characterized in that the rollover bar ($2^5$) comprising the frame for the rear window (4) is placed in a plane inclined by 10°–25° with respect to the vertical plane.

15. Convertible automobile as defined in claim 7 further comprising a connecting lever (9) pivotally connected by a first end to the rollover bar and by a second end to at least one turnable part (10) of the multi-link top mechanism (1) to cause the rollover bar ($2^5$) to move together with the top mechanism.

16. Convertible automobile as defined in claim 7, characterized in that a means for supporting and locking the rollover bar ($2^5$) comprise supporting legs (5), which are fixedly connected to the rollover bar and whose lower ends in the raised position of the rollover bar rest on a back stop (11) placed on the body at a distance from a fulcrum (A) of the rollover bar, and a releasable and lockable locking device (6) for locking the supporting legs to the body.

17. Convertible automobile as defined in claim 16, characterized in that the releasable and lockable locking device (6) comprises a pivoted lever (12) pivotally connected to the body so that it can turn between a releasing position and a locking position, said pivoted lever comprising a locking clutch (13) for engaging the lower end of a supporting leg (5) in the raised position of the rollover bar; a spring (14) for applying a load to the pivoted lever to turn it into the locking position, and a power means (15) for turning the pivoted lever into the releasing position.

18. Convertible automobile as defined in claim 7, characterized in that the rollover bar ($2^5$) in its raised position is located behind a head space of a rear seat of the convertible automobile.

* * * * *